United States Patent [19]
Deguchi et al.

[11] Patent Number: 5,102,948
[45] Date of Patent: Apr. 7, 1992

[54] POLYAMIDE COMPOSITE MATERIAL AND METHOD FOR PREPARING THE SAME

[75] Inventors: Ryuichi Deguchi, Ube; Takeyoshi Nishio, Okazaki; Akane Okada, Obu, all of Japan

[73] Assignees: Ube Industries, Ltd., Ube; Toyota Jidosha Kabushiki Kaisha, Toyota; Kabushiki Kaisha, Aichi, all of Japan

[21] Appl. No.: 518,736

[22] Filed: May 2, 1990

[30] Foreign Application Priority Data

May 19, 1989 [JP] Japan .................................. 1-124402

[51] Int. Cl.$^5$ .......................... C08J 3/20; C08K 3/34; C08L 77/00
[52] U.S. Cl. .................................. 524/789; 524/445; 524/447; 524/448; 524/449
[58] Field of Search ............... 524/445, 447, 448, 449, 524/789

[56] References Cited

U.S. PATENT DOCUMENTS 3,378,514 4/1968 Norton .
4,739,007 4/1988 Okada et al. ........................ 524/789
4,810,734 3/1989 Kawasumi et al. ................. 524/714
4,894,411 1/1990 Okada et al. ........................ 524/736

FOREIGN PATENT DOCUMENTS 1069656 5/1967 United Kingdom .

OTHER PUBLICATIONS

Derwent Abstract corresponding to Japanese Pat. Publn. No. 35211/83 (corresponding to Japanese Pat. Appln. No. 35890/75).

Primary Examiner—Paul R. Michl
Assistant Examiner—U. K. Rajguru
Attorney, Agent, or Firm—Frishauf, Holtz, Goodman & Woodward

[57] ABSTRACT

Disclosed is a polyamide composite material comprising (A) 100 parts by weight of a polyamide resin and (B) 0.05 to 30 parts by weight of a layered silicate uniformly dispersed in the component (A), wherein the reaction ratio of the components (A) and (B) is 60% or less. Disclosed is also a method for preparing a polyamide composite material comprising making a composite in which a layered silicate, with a cation exchange capacity of 50 to 200 milliequivalents/100 g, is in the swelling condition in a dispersion medium; and mixing the composite with a polyamide resin.

9 Claims, 3 Drawing Sheets

POLYAMIDE COMPOSITE MATERIAL AND METHOD FOR PREPARING THE SAME

BACKGROUND OF THE INVENTION

1. Field of the Invention

This invention relates to a polyamide composite material and a method for preparing the same, more particularly to a polyamide composite material having excellent mechanical properties and heat resistance and improved dye-affinity and whitening resistance or antiblooming property during stretching, and a method for preparing the same.

2. Background Invention

There have been practiced to mix and knead inorganic materials such as calcium carbonate, clay minerals, mica, etc. with organic polymer materials including polyamides, in order to improve various properties, particularly mechanical properties thereof.

However, with respect to materials including polyamides, since these inorganic materials cannot ultrafinely be dispersed into polyamide only by mixing and kneading them, a polyamide composite having satisfactory properties has not been obtained.

There has been practiced the method in which a polyamide composite is produced by choosing clay minerals, particularly a clay mineral comprising a layered silicate, as an inorganic material, beforehand making it into a composite with organic compounds such as amino acid, nylon salt, etc., and polymerizing a monomer in the presence of such a composite to produce a polyamide composite comprising the polyamide firmly bound to said composite, in order to enhance affinity or bonding strength between the polyamides and inorganic materials (see Japanese Patent Publication No. 35211/1983).

However, according to the above method, i.e. the polymerization method, since the polyamide composite is obtained by polymerizing the monomer, the end amino groups in the polyamide are consumed during the polymerization reaction step, resulting in blocking of the end amino group. As a result, only polyamide composite materials having insufficient dye-affinity, coating property and printing property have been obtained.

In the above preparation method, further, since the clay minerals act as a terminator, it was difficult to efficiently, economically produce a polyamide/layered silicate composite material of high viscosity type and a polyamide composite material containing layered silicate at high content. In the above conventional method, also, undesirable incorporation of inorganic materials during the polymerization step may cause a drawback that a large amount of a changing loss occurs when the starting materials for polymerization are changed.

In the above conventional method, further, in the instance where the clay/organic material composite in which amino acid or nylon salt is bonded to the clay does not have swellability with a monomer for polymer compounds constituting the composite material or a mixture of the monomer and a dispersion medium, it was difficult to uniformly disperse the composite into the polymer compounds.

As described above, the conventional polyamide composite material, in which the layered silicate is uniformly dispersed therein, had drawbacks that obtained were only a polyamide composite material of which the end amino groups, which can impart dye-affinity, printing property and whitening resistance to the polyamide, are blocked. In the conventional preparation method, the production efficiency is low, and, with the increase of the content of the layered silicate, the production efficiency will become lower, also, the layered silicate acts as an end blocking agent and thus it is difficult to efficiently increase the polymerization degree.

Further, it is difficult or impossible to produce diaminedicarboxylic acid type polyamide containing a layered silicate from conventional diamine-dicarboxylate (see Japanese Unexamined Patent Publication No. 221125/1988).

SUMMARY OF THE INVENTION

An object of the present invention is to solve the above-mentioned problems and to provide polyamide composite materials, in which a layered silicate is uniformly dispersed, having good dye-affinity and whitening resistance in order to prevent the end amino group from blocking. Another object of the present invention is to provide a method for economically, efficiently producing a composite material having wide viscosity range, in which every kind of polyamide resins are used and the layered silicate is uniformly dispersed at high content therein.

The polyamide composite material of the present invention is characterized by comprising (A) 100 parts by weight of a polyamide resin and (B) 0.05 to 30 parts by weight of a layered silicate uniformly dispersed in the component (A), wherein the reaction ratio of the components (A) and (B) is 60% or less, preferably 40% or less.

Another aspect of the present invention is a method for preparing a polyamide composite material characterized by making a composite in which a layered silicate, with a cation exchange capacity of 50 to 200 milliequivalents/100 g, is in the swelling condition in a dispersion medium, and mixing the composite with a polyamide resin.

DESCRIPTION OF THE PREFERRED EMBODIMENTS

Figure 1:
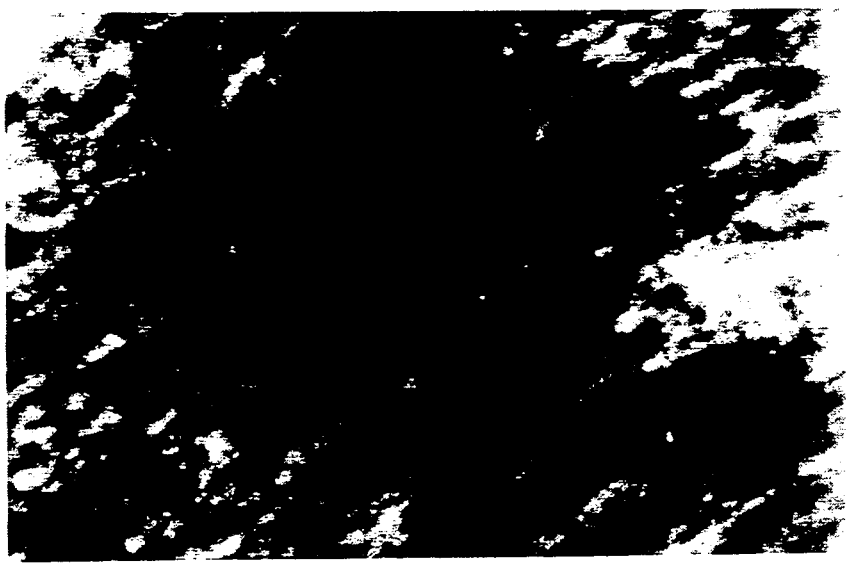
FIG. 1, FIG. 2, FIG. 4 and FIG. 5 are photographs which show the dispersing state of the layered silicate composite in the composite materials obtained in examples.

The polyamide resin of the component (A) may include those having an acid amide bond (—CONH—) in the molecule, including specifically polymers or copolymers obtained from $\epsilon$-caprolactam, 6-aminocaproic acid, $\omega$-enantholactam, 7-aminoheptanoic acid, 11-aminoundecanoic acid, 9-aminononanoic acid, o-pyrrolidone, o-piperidone and the like; polymers or copolymers obtained by polycondensation of diamines such as hexamethylenediamine, nonamethylenediamine, undecamethylenediamine, dodecamethylenediamine, metaxylylenediamine, etc. with dicarboxylic acids such as terephthalic acid, isophthalic acid, adipic acid, sebacic acid, etc.; or blends of these.

The polyamide resin of the component (A) should be preferably one having a number average molecular weight of 9,000 to 40,000.

The polyamide resin of the component (A) may contain other resins, but the content of the other resins is less than 90% by weight. Examples of other resins to be used with the component (A) may include polypropylene, ABS resin, polyphenyleneoxide, polycarbonate, polyethyleneterephthalate, polybutyleneterephthalate, etc.

The component (B) is a layered silicate. The component (B) is a component which contributes to impart excellent mechanical properties and heat resistance to the molded product obtained from the polyamide composite material of the present invention.

The shape of the layered silicate may be preferably one having generally a thickness of 6 to 20 Å and a one side length within the range of 0.002 to 1 μm.

In the present invention, the layered silicate when dispersed in the component (A) is uniformly dispersed with the respective dispersed layers maintaining interlayer distances of 20 Å or more on an average. Here, the interlayer distance refers to the distance between the gravity centers of flat plates of the layered silicate, and uniform dispersion refers to the dispersed state in which each one sheet of the layered silicate or a multi-layer of 5 layers or less on an average exists in parallel or randomly, or under the state where parallel and random states exist in mixture, with 50% or more, preferably 70% or more, thereof forming no local mass.

As the starting material for such a layered silicate, layered phyllosilicate minerals constituted of layers of magnesium silicate or aluminum silicate may be exemplified.

Specifically, there can be included smectite type clay minerals such as montmorillonite, saponite, beidellite, nontronite, hectorite, stevensite, etc. and vermiculite, pyroysite, etc., and these can be either natural or synthetic. Among these, montmorillonite is preferred.

The formulation ratio of the component (B) may be preferably 0.05 to 30 parts by weight, more preferably 0.1 to 10 parts by weight per 100 parts by weight of the components (A). If the formulation ratio of the component (B) is less than 0.05 part by weight, improvements of rigidity and heat resistance of the molded product are undesirably small, while if it exceeds 30 parts by weight, the flowability of the resin composition will be extremely lowered and moldability will be lowered and thus the resin composition will become inappropriate as a material for molding.

The reaction rate percentage between the polyamide of the component (A) and the uniformly dispersed layered silicate of the component (B) is 60% or less, preferably 40% or less. If the reaction rate percentage exceeds 60%, the density of the end group will undesirably become lower, and thus the dye-affinity, coating property and printing property will become worse, resulting in adverse an effect in appearance of the products such as fibers, injection molded products, films, tubes, and the like, and sometimes cause for whitening during stretching due to the strong reaction between the layered silicate and polyamide.

The reaction rate percentage between the layered silicate and polyamide is determined by the method mainly comprising a titration shown below.

<Determination method of the reaction rate percentage between the polyamide and layered silicate>

(Reaction rate percentage pointing at an acid equivalent)

A: an acid equivalent of the added layered silicate
B: an alkaline equivalent of the added layered silicate
C: an acid equivalent when a polyamide and the layered silicate do not react at all (carboxylic group of the polyamide + A)
D: an acid equivalent when the polyamide and layered silicate completely react (the carboxylic group of the polyamide - B) [provided that the amino group of the polyamide > A]
E: an acid equivalent of the material obtained $$\text{Reaction rate percentage } (R_C) = \frac{C - E}{C - D} \times 100$$

(Reaction rate percentage pointing at an alkaline equivalent)

A: an acid equivalent of the added layered silicate
B: an alkaline equivalent of the added layered silicate
C': an acid equivalent when a polyamide and the layered silicate do not react at all (an amino group of the polyamide + B)
D': an acid equivalent when the polyamide and layered silicate completely react (the amino group of the polyamide - A) [provided that a carboxylic group of the polyamide > B]
E': an alkaline equivalent of the material obtained $$\text{Reaction rate percentage } (R_A) = \frac{C - E}{C - D} \times 100$$

The acid and alkaline equivalents are each determined by titration in appropriate medium. In the present invention, average values of the above Ro and RA are employed as the reaction rate percentage.

The carboxylic group and amino group amounts of the polymer are determined by various methods, but may be determined by a relative viscosity $\eta_r$ of the product produced. In this instance, when the ends of the polymer are blocked or modified, the difference thereof must be corrected.

Another aspect of the present invention is a method for preparing a polyamide composite material. The method for producing the composite material of the present invention is characterized by obtaining a composite in which a layered silicate, with a cation exchange capacity of 50 to 200 milliequivalents/100 g, is in the swelling condition in a dispersion medium, and mixing the composite with a polyamide resin for a residence time of 30 minutes or less, to obtain a composite material in which the layered silicate is uniformly dispersed in the polyamide resin. In the present invention, "mixing" includes kneading, and may preferably be conducted with kneading. Hereinafter, the mixing step may be called as to mixing and kneading, mixing and/or kneading, or simply kneading.

In the present invention, the swelling refers to the phenomenon that the layered silicate absorbs the dispersion medium to expand the volume. Preferred combination of the layered silicate and dispersion medium is such that the swelling degree is 5 cc/g or more. The swelling degree may be determined by various methods, but may be determined by a ratio of a volume obtained by the sedimentation volume method ("Nendo Handbook", Nihon Nendo Gakukai, Edited by Keinosuke Nagasawa, published by Gihodo Shuppan K.K., (1987), p 513 et seq.) and a weight of the layered silicate under absolute dry condition. When the swellability of the layered silicate and dispersion medium is very good, the layered silicate will be ultrafinely dispersed in the dispersion medium and not be sedimentated by gravity, whereby the determination is impossible. This case is also, of course, the combination of the layered silicate, which can be swelled very well, and the dispersion medium.

The swelling condition of the present invention can be accomplished by using dispersion medium, by which the swelling degree of the layered silicate will become 5 cc/g or more, in an amount of 1 part by weight or more per 1 part by weight of the layered silicate.

The layered silicate to be used in the preparation method of the present invention has a cation exchange capacity of 50 to 200 milliequivalents/100 g. If the cation exchange capacity is less than 50 milliequivalents/100 g, the swelling cannot be sufficiently effected, whereby the desired composite material can be obtained with difficulty. If it exceeds 200 milliequivalents/100 g, the bonding force between layers of the layered silicate becomes too firm and therefore the desired composite material of the present invention can be obtained only with difficulty.

The layered silicate of the present invention is a layered phyllosilicate formed by a magnesium silicate layer or an aluminum silicate layer having a layer thickness of 6 to 20 Å, and is charged negatively by the isomorphous ion. The layered silicate, which varies the characteristics depending on the density and distribution of the negative electric charge, should preferably have the occupied area on the layer surface per one negative electric charge of 25 to 200 Å$^2$.

The layered silicate should be preferably adjusted previously to the desired shape and size by carrying out a crushing treatment by means of a mixer, ball mill, vibration mill, pin mill, jet mill, grinder, etc.

Also, alkali ions, alkaline earth metal ions and the like in the layered silicate may be removed by substitution with the organic compounds shown below or a hydrogen ion.

As the organic compounds, ammonium salts, pyrridinium salts, sulfonium salts and phosphonium salts, which are onium salts having an onium ion group in the molecular can be exemplified.

More specifically, the organic compounds may include those having ions such as octadecylammonium ion $CH_3(CH_2)_{17}N^+H_3$, monomethyloctadecylammonium ion $CH_3(CH_2)_{17}N^+H_2(CH_3)$, dimethyloctadecylammonium ion $CH_3(CH_2)_{17}N^+H(CH_3)_2$, dodecylammonium ion $CH_3(CH_2)_{11}N^+H_3$, 4-amino-n-butyric acid ion $H_3^+N(CH_2)_3COOH$, 6-amino-n-caproic acid ion $H_3^+N(CH_2)_5COOH$, 8-aminocaprylic acid ion $H_3^+N(CH_2)_7COOH$, 10-aminodecanoic acid ion $H_3^+N(CH_2)_9COOH$, 12-aminododecanoic acid ion $H_3^+N(CH_2)_{11}COOH$, 14-aminotetradecanoic acid ion $H_3^+N(CH_2)_{13}COOH$, 16-aminohexadecanoic acid ion $H_3^+N(CH_2)_{15}COOH$, 18-aminooctadecanoic acid ion $H_3^+N(CH_2)_{17}COOH$, and the like.

In place of substitution of the sodium in the layered silicate with the organic substance as described above, the substitution may be made with hydrogen by use of an acid or an ion exchange resin, then the substituted layered silicate may be employed in combination with a solvent having a swellability with it and used as a starting material for the composite material.

The dispersion medium performs the action of expanding the distance between the layered silicate layers and making the dispersion of the layered silicate easier in kneading.

The dispersion medium can be determined suitably depending on the kind of the layered silicate, swelling agent and polyamide resin, but one which can disperse uniformly the layered silicate and has good compatibility with the swelling agent and polyamide resin is preferred.

Examples of the dispersion medium may include water, methanol, ethanol, propanol, isopropanol, ethylene glycol, 1,4-butane diol, glycerine, dimethylsulfoxide, N,N-dimethylformamide, acetic acid, formic acid, pyridine, aniline, phenol, nitrobenzene, acetonitrile, acetone, methyl ethyl ketone, chloroform, carbon disulfide, propyrene carbonate, 2-methoxyethanol, ether, carbon tetrachloride, n-hexane, ε-caprolactam, ω-lauric lactam, aminocaproic acid, aminododecanoic acid, etc. The dispersion medium can be used singly or in combination of two or more kinds.

Particularly, water, methanol, ethanol and/or ε-caprolactam should preferably be used as the dispersion medium.

The amount of the dispersion medium employed should preferably be 100 to 5,000 parts by weight based on 100 parts by weight of the layered silicate. If the amount of the dispersion medium employed is less than 100 parts by weight, the viscosity of the composite will become excessively higher in the mixing and kneading step to make the feed thereof in the kneading difficult and also the kneading of the composite and polyamide resin will become undesirably difficult. If the amount of the dispersion medium employed exceeds 5,000 parts by weight, the dispersion medium in the kneading step can be removed only with difficulty, whereby a large amount of the dispersion medium will remain in the composite material, the composite material at an outlet of a kneader will contain bubbles and thus a material with stable quality cannot be obtained, a large amount of the materials should necessarily be fed, and resultingly the uniform kneading will become undesirably difficult.

The method and condition for making the layered silicate and solvent into the swelling condition is not particularly limited, and may be made by, for example, the method in which the layered silicate is little by little poured into solvent previously charged and stirred in a vessel.

The mixing condition may also desirably be selected, but it is preferable for making the swelling condition to stir for a long time at high temperature being such that a deterioration of the solvent will not occur.

The composite under the swelling condition can be subjected to kneading as such, but may be subjected to the subsequent step after removing a part of the dispersion medium, if necessary. In the instance where the dispersion medium is removed, it is preferable to control the content of the dispersion medium in the composite within the above range.

The mixing and/or kneading step subsequently carried out is a step in which the composite in the swelling condition and the polyamide resin are mixed and kneaded.

The method for mixing and kneading and the condition therefor differ depending on the kind of the polymer compounds. The composite employed may be heated beforehand, if necessary.

In the mixing and kneading step, if necessary, there can be formulated and kneaded moldability improving agents such as other polymer materials, dyes, pigments, fibrous reinforcing materials, granular reinforcing materials, mold release agents, thickening agent, etc., plasticizers, impact resistance improving agents, foaming agents, heat resistance improving agents, flame retardants, etc.

The composite material of the present invention may be dried as such after being kneaded and then subjected to molding, or may be dried after the solvent remaining in the composite material is removed by water, followed by molding.

The composite material of the present invention may be utilized by molding by injection molding, extrusion molding, heating-compression molding, etc.

EXAMPLES

EXAMPLE 1

100 g of montmorillonite produced in Yamagata prefecture with a cation exchange capacity of 119 milliequivalents/100 g, an occupied area per one negative charge: 106 $Å^2$, an average layer thickness of 8 Å and the interlayer distance between the layers of 12.5 Å (hereinafter, abbreviated as NaMMT) were dispersed in 2.3 liters of water, and 28.1 g of 12-aminododecanoic acid and 12 ml of conc. hydrochloric acid were added thereto, followed by stirring at 80 °C. for 60 minutes. After thoroughly washing, the mixture was suction filtered by use of a Büchner funnel to obtain a composite under hydrous state (hereinafter abbreviated as 12 MMT). A part of the composite was sampled and the water content value was determined by the following formula:

$$\text{Water content (\%)} = \frac{\text{Water content in hydrous 12 } MMT}{\text{Weight of hydrous 12 } MMT} \times 100$$

The water content was measured to be 88%. The interlayer distance of 12 MMT, the composite of 12-aminododecanoic acid and montmorillonite, was found to be 18 Å.

Next, water and ε-caprolactam were added into the 12 MMT so that the ratio of 12 MMT of 12-aminododecanoic acid and montmorillonite, water and ε-caprolactam becomes 1 : 9 : 9, followed by stirring and mixing.

The swelling degree of the composite was measured to be 14.6 cc/g. The swelling degree was measured by the following method.

A solution of the dried 12 MMT, water and ε-caprolactam being in the ratio of 1 : 50 : 50 was prepared, and thoroughly stirred and mixed. The solution was charged into a 50 cc-test tube provided with a graduation, centrifuged by a centrifuger at 1,500 rpm, 500 G for 480 minutes to sedimentate the 12 MMT. The sedimentated volume was measured and the measured value was divided by the 12 MMT content (gram) to determine the swelling degree.

Into 98 parts by weight of nylon 6 (average molecular weight: 15,000), 38 parts by weight of the 12 MMT composite, which was prepared by adding water and ε-caprolactam into the composite (12 MMT) of 12-aminododecanoic acid and montmorillonite, was added, and melted and kneaded with use of a biaxial extruder with a screw diameter of 30 mm. Then, the resultant product was taken in the shape of strand from a nozzle of the extruder, cooled with water and cut into a pellet comprising the nylon 6 and a composite. The pellet was immersed in a hot water and the ε-caprolactam which is a kind of dispersion medium in the 12 MMT was removed by extraction, followed by drying in vacuum (this preparation method is hereinafter called to as kneading method). The interlayer distance of montmorillonite in the composite material obtained by such a treatment was observed by use of a transmission electron microscope.

The transmission electron microphotograph at 15,000 power is shown in FIG. 1.

The results are shown in Table. The evaluation of the observation of the transmission electron microscope was conducted in accordance with the standard shown below.

o: excellent dispersibility, some two layers are slightly recognized.

Δ: good dispersibility, not more than 5 layers are recognized.

x: poor dispersibility, considerable amount of not less than 5 layers are recognized.

xx: very poor dispersibility, most are mass of not less than 5 layers.

The composite material obtained was molded into a test strip. The test strip was subjected to determination of tensile strength, flexural modulus and heat distortion temperature. The results are shown in Table 1.

Also, $\eta_r$ of the material obtained was determined in accordance with JIS-K 6810, and further the concentration of both end groups of amino group and carboxylic group was measured. From these values, the reaction rate ratio and the end group maintaining ratio [1 - (reaction rate ratio)] were calculated in accordance with the method prescribed above.

In other words, the end group maintaining rate percentage in the present invention is more than 40%, preferably more than 60%.

A film with a thickness of 60 μ was prepared by using this composite material and stretched at a stretching temperature of 80 °C. to each 2-fold laterally and longitudinally, followed by a measurement of transparency (Haze) in accordance with ASTMD-1033.

Also, a plate with a size of 70 mm × 30 mm × 3 mm was prepared by using this material by injection molding and evaluated with respect to the dye-affinity.

The evaluation of the dye-affinity was determined by thoroughly immersing the plate in the solution, which was prepared by dissolving an acid dye Inolar Fast Bril Red S 3B by 0.075% OWF in purified water and further adding acetic acid by 0.4% OWF, at a bath ratio of 1 : 22 at 76° C. for 5 minutes, and measuring the degree of red pigmentation by means of a digital color meter (manufactured by Suga Shikenki K.K.).

Further, in the above kneading operation, when the feeding of the 12 MMT composite was stopped so that usual nylon 6 may be obtained, the amount of an intermediate product with a content of 12 MMT ranging from 1.8% to 30 ppm was only 3.3 kg and thus it was possible to conduct grade change immediately with less loss.

EXAMPLE 2

The experiment of Example 1 was repeated provided that nylon 6 (average molecular weight 15,000) was changed to nylon 66 (average molecular weight 20,000).

Figure 2:
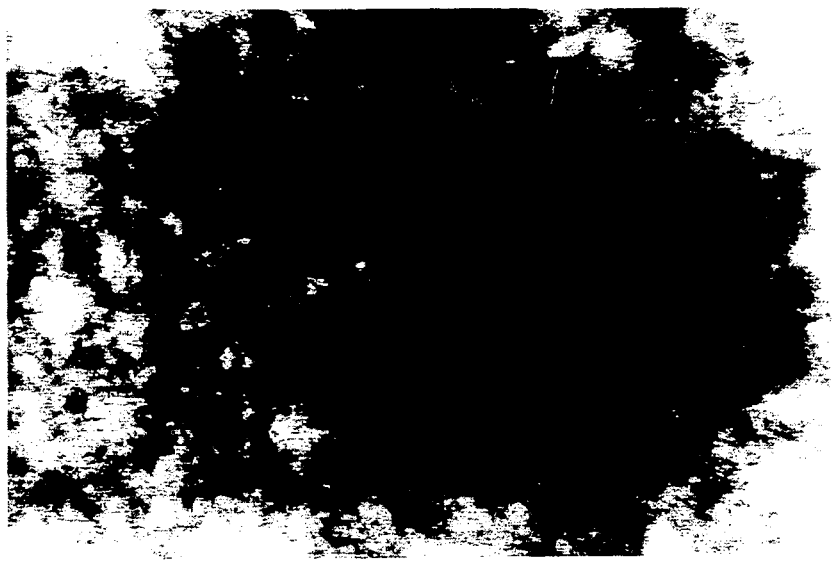

The transmission electron microphotograph at 15,000 power of the composite material obtained is shown in FIG. 2. The results of measurement are also shown in Table 1.

Comparative example 1

A monomer of (-caprolactam and 12MMT in the ratio of 108 : 2 (98 : 2 as a product) and a small amount of polymerization catalyst were continuously fed into a vertical type polymerization column (volumn: 65 liter) from the upper portion at 6 kg/hr, and subjected to polymerization at polymerization temperature of 260° C. for a residence time of about 10 hours, followed by continuous extrusion of the polymerized compound at a uniform rate from the bottom of the polymerization column. Further, the unreacted substance of the material was extracted with hot water, and dried in vacuum to obtain a composite material. This composite material was evaluated in the same manner as in Example 1. The results are also shown in Table 1.

In the above kneading operation, when the feeding of the 12 MMT was stopped and the operation was changed so that usual nylon 6 may be obtained, the amount of an intermediate product with a content of 12 MMT ranging from 1.8% to 30 ppm was 5,250 kg.

Comparative example 2

11 kg of the same monomer and the same polymerization catalyst as in Comparative example 1 were charged in a batch polymerization bath, and polymerized at 260° C. for 5 hours, followed by extraction with hot water and drying to obtain a composite material. The obtained composite material was evaluated in the same manner as in Comparative example 1. The results are also shown in Table 1.

Comparative example 3

The same experiment and evaluation as in Comparative example 2 were conducted provided that 10.8 kg of ε-caprolactam in Comparative example 2 was changed to 12.6 kg of hexamethylenediamine adipate (AH salt).

Figure 3:
FIG. 3 and FIG. 6 are photographs which show the dispersing state of the layered silicate composite in the composite materials obtained in comparative examples.

The transmission electron microphotograph at 15,000 power of the composite material obtained is shown in FIG. 3. The results of measurement are also shown in Table 1.

EXAMPLE 3

The experiment in Example 1 was repeated provided that the ratio of nylon 6 and 12MMT/ε-caprolactam/water composite was changed to 94.7 : 98.8 in Example 1.

Figure 4:
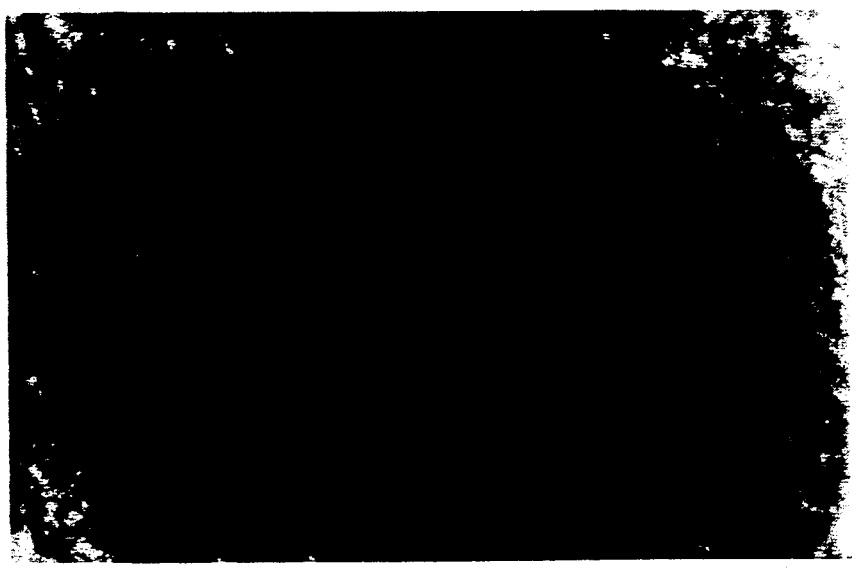

The transmission electron microphotograph at 15,000 power of the composite material obtained is shown in FIG. 4. The results of measurement are shown in Table 2.

EXAMPLE 4

The experiment in Example 1 was repeated provided that the composite in Example 1 was changed to a composite of 12MMT and ε-caprolactam in the ratio of 1 : 9 and the composite was fed to nylon 6 in the ratio of 98 : 20 at 120° C. The results of measurement are also shown in Table 2.

EXAMPLE 5

The experiment in Example 4 was repeated provided that the dispersion medium, ε-caprolactam, in Example 4 was changed to water. The results of measurement are also shown in Table 2.

EXAMPLE 6

The experiment in Example 1 was repeated provided that the layered silicate composite (12MMT) in Example 1 was changed to Na montmorillonite (NaMMT).

Figure 5:

The transmission electron microphotograph at 15,000 power of the composite material obtained is shown in FIG. 5. The results of measurement are also shown in Table 2.

Comparative example 5

The experiment in Example 1 was tried to repeat provided that the ratio of the layered silicate composite (12MMT) and the dispersion medium in Example 1 was changed to 1 : 0.5. However, the viscosity of the composite was so high that the feed thereof was difficult, resulting in failure of production.

Comparative example 6

The experiment in Example 1 was repeated provided that nylon 6 and a layered silicate composite containing no dispersion medium (obtained by organizing 12MMT and Na montmorillonite by use of hydrochloric acid solution of aminododecanoic acid, followed by drying and pulverization) were dry blended at a ratio of 98 : 2 and kneaded. The results of measurement are also shown in Table 3.

Comparative example 7

The experiment in Comparative example 6 was repeated provided that the layered silicate composite (12MMT) in Comparative example 6 was changed to Na montmorillonite (NaMMT). The results of measurement are also shown in Table 3.

Comparative example 8

The experiment in Example 4 was repeated provided that the layered silicate composite (12MMT) in Example 4 was changed to Na montmorillonite (NaMMT).

Figure 6:

The transmission electron microphotograph at 15,000 power of the composite material obtained is shown in FIG. 6. The results of measurement are also shown in Table 3.

Referential examples 1 and 2

The experiments in Examples 1 and 2 were repeated provided that the kneading was conducted without adding the composite.

TABLE 1

| Preparation method | | Example 1 Kneading method | Example 2 Kneading method | Comparative example 1 Continuous polymerization method | Comparative example 2 Batch polymerization method | Comparative example 3 Batch polymerization method |
| --- | --- | --- | --- | --- | --- | --- |
| A; Polyamide used for kneading | Kind | PA6 | PA66 | — | — | — |
| | Average molecular weight | 15,000 | 20,000 | — | — | — |
| A; Monomer used for polymerization | | — | — | Lc | Lc | AH Salt |
| D; Composite | B; Kind of layered silicate composite | 12MMT | 12MMT | 12MMT | 12MMT | 12MMT |
| | C; Dispersion medium | Lc/water = 1/1 | Lc/water = 1/1 | — | — | — |

TABLE 1-continued

|  |  | Example 1 Kneading method | Example 2 Kneading method | Comparative example 1 Continuous polymerization method | Comparative example 2 Batch polymerization method | Comparative example 3 Batch polymerization method |
|---|---|---|---|---|---|---|
| Preparation method |  |  |  |  |  |  |
|  | Swelling degree of B and C (cc/g) | 14.6 | 14.6 | — | — | — |
|  | Mixing ratio of B and C | 1:18 | 1:18 | — | — | — |
| Mixing ratio of A and D |  | 98:38 | 98:26 | 108:2 | 108:2 | 116:2 |
| Composite material obtained | Content of B (%) | 2 | 2 | 2 | 2 | 2 |
|  | ηr | 2.88 | 2.85 | 2.82 | 2.85 | 2.87 |
|  | End group maintaining ratio (1 - reaction rate ratio) | 86% | 89% | 32% | 25% | — |
|  | Dispersing condition observed by transmission electron microscope | ⊚ | ⊚ | ⊚ | ○ | xx |
|  | Flexural modulus (kg/cm$^2$) | 35,800 | 35,700 | 34,600 | 34,100 | 30,800 |
| Dye-affinity, degree of red pigmentation |  | 10.0 | — | 0° | — | — |
| Stretched film Haze (%) |  | 7.2 | — | 9.4 | — | — |

Lc = ε-caprolactam
AH salt: hexamethylenediamine adipate
°Comparative example 1 was regarded as a standard

TABLE 2

|  |  | Example 3 Kneading method | Example 4 Kneading method | Example 5 Kneading method | Example 6 Kneading method |
|---|---|---|---|---|---|
| Preparation method |  |  |  |  |  |
| A; Polyamide used for kneading | Kind | PA6 | PA6 | PA6 | PA6 |
|  | Average molecular weight | 22,000 | 15,000 | 15,000 | 13,000 |
| D; Composite | B: Kind of layered silicate composite | 12MMT | 12MMT | 12MMT | NaMMT |
|  | C; Dispersion medium | Lc/water = 1/1 | Lc | Water | Lc/water = 1/1 |
|  | Swelling degree of B and C (cc/g) | 14.6 | 10.0 | 9.6 | 6.5 |
|  | Mixing ratio of B and C | 1:18 | 1:9 | 1:9 | 1:18 |
| Mixing ratio of A and D |  | 94.7:98.8 | 98:20 | 98:20 | 98:38 |
| Composite material obtained | Content of B (%) | 5.3 | 2 | 2 | 2 |
|  | ηr | 3.34 | 2.89 | 2.74 | 2.64 |
|  | End group maintaining ratio (1 - reaction rate ratio) | 90% | 87% | 82% | 91% |
|  | Dispersing condition observed by transmission electron microscope | ⊚ | ⊚ | ○ | Δ |
|  | Tensile strength (kg/cm$^2$) | 990 | 860 | 920 | 900 |
|  | Flexural modulus (kg/cm$^2$) | 45,000 | 36,100 | 35,100 | 34,800 |
|  | Heat distortion temperature [(°C.) load 18.6 kg/cm$^2$] | 163 | 147 | 138 | 133 |

Lc = ε-caprolactam

TABLE 3-1

|  |  | Example 1 Kneading method | Comparative example 5 Kneading method | Comparative example 6 Kneading method dry blend | Comparative example 7 Kneading method |
|---|---|---|---|---|---|
| Preparation method |  |  |  |  |  |
| A; Polyamide used for kneading | Kind | PA6 | PA6 | PA6 | PA6 |
|  | Average molecular weight | 15,000 | 15,000 | 15,000 | 15,000 |
| D; Composite | B: Kind of layered silicate composite | 12MMT | 12MMT | 12MMT (water free powder) | NaMMT |
|  | C; Dispersion medium | Lc/water = 1/1 | Lc/water = 1/1 | — | — |
|  | Swelling degree of B and C (cc/g) | 14.6 | 14.6 | — | — |
|  | Mixing ratio of B and C | 1:18 | 1:0.5 | — | — |
| Mixing ratio of A and D |  | 93:38 | 98:3 | 98:2 | 98:2 |
| Composite material obtained | Content of B (%) | 2 | Feeding to a kneader was difficult, and production was impossible | 2 | 2 |
|  | ηr | 2.88 |  | 2.82 | 2.88 |
|  | End group maintaining ratio (1 - reaction rate ratio) | 86% |  | 98% | 100% |
|  | Dispersing condition observed by transmission | ○ |  | ⊚⊚ | xx |

TABLE 3-1-continued

| Preparation method | | Example 1 Kneading method | Comparative example 5 Kneading method | Comparative example 6 Kneading method dry brend | Comparative example 7 Kneading method |
|---|---|---|---|---|---|
| | electron microscope | | | | |
| | Tensile strength (kg/cm$^2$) | 950 | | 860 | 770 |
| | Flexural modulus (kg/cm$^2$) | 35,800 | | 34,300 | 29,600 |
| | Heat distortion temperature [(°C.) load 18.6 kg/cm$^2$] | 152 | | 107 | 92 |

Lc = ε-caprolactam
**Layered silicate was dispersed poorly (Δ ~ ○), and pulverized and destroyed. One side length was about a half of that of Example 1.

TABLE 3-2

| Preparation method | | Comparative Example 8 Kneading method | Referential example 1 — | Referential example 2 — |
|---|---|---|---|---|
| A; Polyamide used for kneading | Kind | PA6 | PA6 | PA66 |
| | Average molecular weight | 15,000 | 15,000 | 20,000 |
| D; Composite | B; Kind of layered silicate composite | NaMMT | — | — |
| | C; Dispersion medium | Lc | — | — |
| | Swelling degree of B and C (cc/g) | 4.0 | — | — |
| | Mixing ratio of B and C | 1:9 | — | — |
| Mixing ratio of A and D | | 98:20 | — | — |
| Composite material obtained | Content of B (%) | 2 | — | — |
| | ηr | 2.90 | 2.87 | 2.89 |
| | End group maintaining ratio (1 - reaction rate ratio) | 100% | — | — |
| | Dispersing condition observed by transmission electron microscope | X | — | — |
| | Tensile strength (kg/cm$^2$) | 760 | 750 | 780 |
| | Flexural modulus (kg/cm$^2$) | 29,900 | 26,000 | 29,600 |
| | Heat distortion temperature [(°C.) load 18.6 kg/cm$^2$] | 98 | 75 | 90 |

Lc = ε-caprolactam
**Layered silicate was dispersed poorly (Δ ~ ○), and pulverized and destroyed. One side length was about a half of that of Example 1.

The present invention can provide a polyamide composite material in which layered silicate is uniformly dispersed without blocking an amino end group which can impart various characteristics such as dye-affinity, printing property, whitening resistance, etc. to polyamide resins.

The present invention can also provide a method which can uniformly disperse a layered silicate at high content with respect to every polyamide resins, and which can prepare, more economically and efficiently, a polyamide composite material having a viscosity of wide range.

We claim:

1. A method for preparing a polyamide composite material comprising forming a composite by admixing a layered silicate having a cation exchange capacity of 50 to 200 milliequivalents/100 g with a dispersion medium, whereby said layered silicate swells and has a swelling degree of 5 cc/g or more, said dispersion medium being in an amount of 1 part by weight or more per 1 part by weight of the layered silicate and mixing the composite with a polyamide resin.

2. The method according to claim 1, wherein the layered silicate has an occupied area on the layer surface per one negative electric charge of 25 to 200 Å$^2$.

3. The method according to claim 1, wherein the layered silicate is subjected to substitution with use of at least one of an organic compound and hydrogen ion.

4. The method according to claim 3, wherein the layered silicate is substituted with an organic compound and said organic compound is at least one compound selected from the group consisting of ammonium salts, pyrridinium salts, sulfonium salts and phosphonium salts.

5. The method according to claim 3, wherein the layered silicate is substituted with an organic compound, and said organic compound is at least one selected from the group consisting of those having ions of octadecylammonium ion, monomethyloctadecylammonium ion, dimethyloctadecylammomium ion, dodecylammonium ion, 4-amino-n-butyric acid ion, 6-amino-n-caproic acid ion, 8-aminocaprylic acid ion, 10-aminodecanoic acid ion, 12-aminododecanoic acid ion, 14-aminotetradecanoic acid ion, 16-aminohexadecanoic acid ion and 18-aminooctadecanoic acid ion.

6. The method according to claim 1, wherein the dispersion medium is at least one selected from the group consisting of water, methanol, ethanol, propanol, isopropanol, ethylene glycol, 1,4-butane diol, glycerine, dimethylsulfoxide, N,N-dimethylformamide, acetic acid, fumaric acid, pyridine, aniline, phenol, nitrobenzene, acetonitrile, acetone, methyl ethyl ketone, chloroform, carbon disulfide, propyrene carbonate, 2-methoxyethanol, ether, carbon tetrachloride, n-hexane, ε- caprolactam, ω-lauric lactam, aminocaproic acid and aminododecanoic acid.

7. The method according to claim 1, wherein the amount of the dispersion medium employed is 100 to 5,000 parts by weight based on 100 parts by weight of the layered silicate.

8. The method according to claim 1, wherein the composite and the polyamide resin are reacted in an reaction rate percentage of 60% or less.

9. The method according to claim 5, wherein the dispersion medium is at least one selected from the group consisting of water, methanol, ethanol, propanol, isopropanol, ethylene glycol, 1,4-butane diol, glycerine, dimethylsulfoxide, N,N-dimethylformamide, acetic acid, fumaric acid, pyridine, aniline, phenol, nitrobenzene, acetonitrile, acetone, methyl ethyl ketone, chloroform, carbon disulfide, propyrene carbonate, 2-methoxyethanol, ether, carbon tetrachloride, n-hexane, ε-caprolactam, ω-lauric lactam, aminocaproic acid and aminododecanoic acid, the amount of the dispersion medium employed is 100 to 5,000 parts by weight based on 100 parts by weight of the layered silicate and the composite and the polyamide resin are reacted in a reaction rate percentage of 60% or less.

* * * * *

UNITED STATES PATENT AND TRADEMARK OFFICE
CERTIFICATE OF CORRECTION

PATENT NO.   : 5,102,948
DATED        : April 7, 1992
INVENTOR(S)  : DEGUCHI et al It is certified that error appears in the above-identified patent and that said Letters Patent is hereby corrected as shown below:

TITLE PAGE:

Section [54] - change the title to read

--METHOD FOR PREPARING A POLYAMIDE COMPOSITE MATERIAL--.

Section [73] Assignees -

Change the name of the third assignee to read

--Kabushiki Kaisha Toyota Chuo Kenkyusho--.

Signed and Sealed this

Tenth Day of August, 1993

Attest:

MICHAEL K. KIRK

Attesting Officer

Acting Commissioner of Patents and Trademarks